(12) United States Patent
Amari et al.

(10) Patent No.: US 12,674,424 B2
(45) Date of Patent: Jul. 7, 2026

(54) METHOD AND APPARATUS FOR USING MODEL PREDICTIVE CONTROL FOR HYBRID ELECTRIC PROPULSION SYSTEM

(71) Applicant: RTX CORPORATION, Farmington, CT (US)

(72) Inventors: Martin Amari, Glastonbury, CT (US); Joshua Adams, New Hartford, CT (US); Kyle Christopher Musselman, Vernon, CT (US)

(73) Assignee: RTX CORPORATION, Farmington, CT (US)

( * ) Notice: Subject to any disclaimer, the term of this patent is extended or adjusted under 35 U.S.C. 154(b) by 205 days.

(21) Appl. No.: 18/544,615

(22) Filed: Dec. 19, 2023

(65) Prior Publication Data

US 2025/0198349 A1 Jun. 19, 2025

(51) Int. Cl.
*F02C 7/36* (2006.01)
*B64D 27/33* (2024.01)

(52) U.S. Cl.
CPC .............. *F02C 7/36* (2013.01); *B64D 27/33* (2024.01); *F05D 2220/323* (2013.01)

(58) Field of Classification Search
CPC ... F02C 7/36; F02C 9/28; B64D 27/33; B64D 27/026; F05D 2220/323; F05D 2220/36; F05D 2270/02; F05D 2270/04; F05D 2270/335; F05D 2270/44; F02K 5/00
See application file for complete search history.

(56) References Cited

U.S. PATENT DOCUMENTS

| | | | |
|---|---|---|---|
| 11,015,480 | B2 | 5/2021 | Waun |
| 11,378,016 | B2 | 7/2022 | Chapman et al. |
| 11,401,041 | B2 | 8/2022 | Baig et al. |

(Continued)

FOREIGN PATENT DOCUMENTS

CN 114996906 9/2022

OTHER PUBLICATIONS

Doff-Sotta, Martin et al., "Predictive Energy Management for Hybrid Electric Aircraft Propulsion Systems," IEEE Transactions on Control Systems Technology, vol. 31, No. 2, Mar. 2023, pp. 602-614 (Year: 2023).*

(Continued)

*Primary Examiner* — Nathaniel E Wiehe
*Assistant Examiner* — Joshua R Beebe
(74) *Attorney, Agent, or Firm* — Carlson, Gaskey & Olds, P.C.

(57) ABSTRACT

A method for a hybrid electric propulsion (HEP) system includes determining a target fan speed for a HEP system. The HEP system includes a gas turbine engine and at least one electric motor configured to rotate a respective shaft of the gas turbine engine. The method also includes determining an amount of electrical power that is currently available to the HEP system; utilizing a model predictive control (MPC) to determine, based on the amount of available electrical power and a plurality of operating limits of the HEP system, an effector command set that includes a power splitting profile indicating a power split between the gas turbine engine and the at least one electric motor for achieving the target fan speed; and implementing the effector command set. A controller for a hybrid electric propulsion (HEP) system is also disclosed.

16 Claims, 5 Drawing Sheets

(56) References Cited

U.S. PATENT DOCUMENTS

| | | | |
|---|---|---|---|
| 2019/0002113 A1 | 1/2019 | Gansler et al. | |
| 2020/0392903 A1* | 12/2020 | Turner | F02C 9/54 |
| 2021/0222629 A1* | 7/2021 | Terwilliger | B64D 27/31 |
| 2023/0042497 A1 | 2/2023 | Terwilliger et al. | |
| 2023/0136062 A1 | 5/2023 | Amari | |
| 2023/0312115 A1 | 10/2023 | Alecu | |

OTHER PUBLICATIONS

European Search Report for European Patent Application No. 24221922.8 dated May 22, 2025.
Doff-Sotta et al., "Predictive energy management for hybrid electric aircraft propulsion systems", IEEE Transactions on control Systems Technology, vol. 31, No. 2, p. 602-614, Mar. 1, 2023.

* cited by examiner

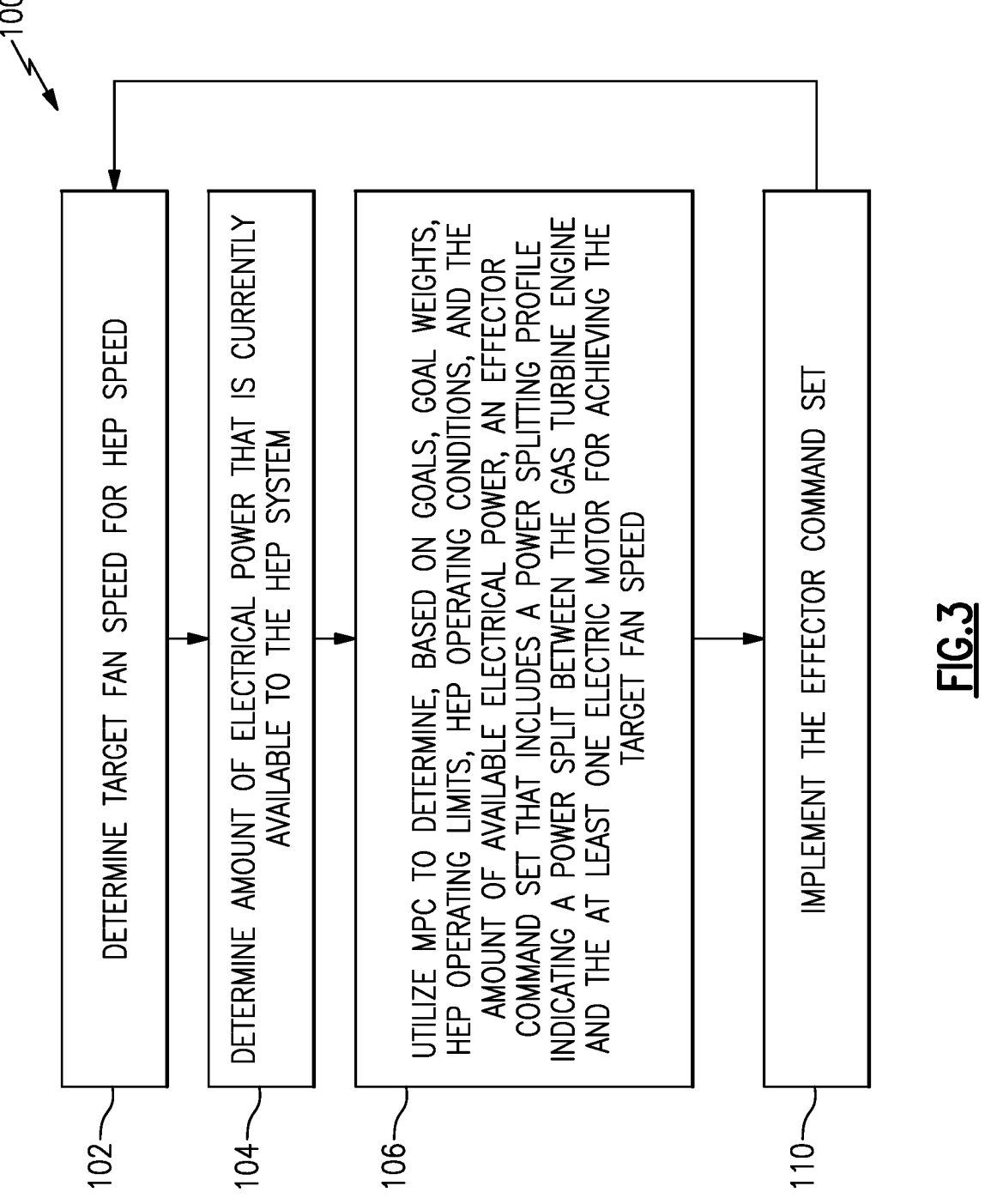

100

102 — DETERMINE TARGET FAN SPEED FOR HEP SPEED

104 — DETERMINE AMOUNT OF ELECTRICAL POWER THAT IS CURRENTLY AVAILABLE TO THE HEP SYSTEM

106 — UTILIZE MPC TO DETERMINE, BASED ON GOALS, GOAL WEIGHTS, HEP OPERATING LIMITS, HEP OPERATING CONDITIONS, AND THE AMOUNT OF AVAILABLE ELECTRICAL POWER, AN EFFECTOR COMMAND SET THAT INCLUDES A POWER SPLITTING PROFILE INDICATING A POWER SPLIT BETWEEN THE GAS TURBINE ENGINE AND THE AT LEAST ONE ELECTRIC MOTOR FOR ACHIEVING THE TARGET FAN SPEED

110 — IMPLEMENT THE EFFECTOR COMMAND SET

FIG.3

METHOD AND APPARATUS FOR USING MODEL PREDICTIVE CONTROL FOR HYBRID ELECTRIC PROPULSION SYSTEM

BACKGROUND

This application relates to a hybrid electric propulsion (HEP) system that utilizes a model predictive control (MPC).

Gas turbine engines are known and typically include a fan delivering air into a bypass duct for propulsion. The fan also delivers air into a compressor where air is compressed and delivered into a combustor. The air is mixed with fuel and ignited. Products of this combustion pass downstream over turbine rotors driving them to rotate. The turbine rotors, in turn, rotate compressor rotors and the fan rotor.

HEP systems utilize a combination of electric power from one or more electric motors and combustion power from one or more gas turbines to provide propulsion for an aircraft, and have been identified as a step towards reducing aircraft fuel consumption and supporting sustainable aviation. The electric motor is powered by a power source, such as one or more lithium-ion batteries. This addition of the renewable power source may lead to higher fuel savings and less carbon footprint of future aircrafts. However, determining a power split between the gas turbine engine and the electric motor(s) presents challenges.

SUMMARY

A method for a hybrid electric propulsion (HEP) system according to an example embodiment of the present disclosure includes determining a target fan speed for a HEP system. The HEP system includes a gas turbine engine and at least one electric motor configured to rotate a respective shaft of the gas turbine engine. The method also includes determining an amount of electrical power that is currently available to the HEP system; utilizing a model predictive control (MPC) to determine, based on the amount of available electrical power and a plurality of operating limits of the HEP system, an effector command set that includes a power splitting profile indicating a power split between the gas turbine engine and the at least one electric motor for achieving the target fan speed; and implementing the effector command set.

In a further embodiment of the foregoing embodiment, the at least one electric motor includes a first electric motor configured to rotate a first shaft of the gas turbine engine, and a second electric motor configured to rotate a second shaft of the gas turbine engine. The power splitting profile indicates a power split between the gas turbine engine, the first electric motor, and the second electric motor.

In a further embodiment of any of the foregoing embodiments, the method includes obtaining weights for a plurality of goals of the HEP system. The plurality of goals includes the target fan speed and at least one prioritization goal for using at least one of the first electric motor and the second electric motor during flight. The MPC utilizes the weights to determine the effector command set.

In a further embodiment of any of the foregoing embodiments, the target fan speed has a highest weighting of the plurality of goals.

In a further embodiment of any of the foregoing embodiments, the method includes iteratively repeating the determining steps, the utilizing the MPC, and the implementing the effector command set for a plurality of sequential time periods.

In a further embodiment of any of the foregoing embodiments, the utilizing step includes utilizing the MPC to determine the power splitting profile based on how quickly the HEP system is approaching each operating limit of the plurality of operating limits of the HEP system.

In a further embodiment of any of the foregoing embodiments, the method includes determining which one of the plurality of limits the HEP system is approaching most quickly. The power splitting profile is determined to slow a rate at which the HEP system is approaching the one of the plurality of limits of the HEP system most quickly.

In a further embodiment of any of the foregoing embodiments, the plurality of operating limits includes operating limits for one or more of: torque of the at least one electric motor, electric power of the at least one electric motor, a pressure in the gas turbine engine, and a temperature in the gas turbine engine.

In a further embodiment of any of the foregoing embodiments, the plurality of operating limits includes operating limits for one or more of: a combustor of the gas turbine engine, a stator vane of the gas turbine engine, and one or more bleed valves of the gas turbine engine.

In a further embodiment of any of the foregoing embodiments, the effector command set also includes commands for at least one of stator vane positions and bleed valve positions.

A controller for a hybrid electric propulsion (HEP) system according to an example embodiment of the present disclosure includes processing circuitry operatively connected to memory. The processing circuitry is configured to determine a target fan speed for a HEP system. The HEP system includes a gas turbine engine and at least one electric motor configured to rotate a respective shaft of the gas turbine engine. The processing circuitry is also configured to determine an amount of electrical power that is currently available to the HEP system; utilize a model predictive control (MPC) to determine, based on the amount of available electrical power and a plurality of operating limits of the HEP system, an effector command set that includes a power splitting profile indicating a power split between the gas turbine engine and the at least one electric motor for achieving the target fan speed; and implement the effector command set.

In a further embodiment of the foregoing embodiment, the at least one electric motor includes a first electric motor configured to rotate a first shaft of the gas turbine engine, and a second electric motor configured to rotate a second shaft of the gas turbine engine. The power splitting profile indicates a power split between the gas turbine engine, the first electric motor, and the second electric motor.

In a further embodiment of any of the foregoing embodiments, the processing circuitry is configured to obtain weights for a plurality of goals of the HEP system. The plurality of goals includes the target fan speed and at least one prioritization goal for using at least one of the first electric motor and the second electric motor during flight. The MPC utilizes the weights to determine the effector command set.

In a further embodiment of any of the foregoing embodiments, the target fan speed has a highest weighting of the plurality of goals.

In a further embodiment of any of the foregoing embodiments, the processing circuitry is configured to iteratively repeat the determination of the target fan speed, the determination of the amount of electrical power that is currently available to the HEP, the utilization of the MPC, and the implementation of the effector command set for a plurality of sequential time periods.

In a further embodiment of any of the foregoing embodiments, the processing circuitry is configured to utilize the MPC to determine the power splitting profile based on how quickly the HEP system is approaching each operating limit of the plurality of operating limits of the HEP system.

In a further embodiment of any of the foregoing embodiments, the processing circuitry is configured to determine which one of the plurality of limits the HEP system is approaching most quickly. The power splitting profile is determined to slow a rate at which the HEP system is approaching the one of the plurality of limits of the HEP system most quickly.

In a further embodiment of any of the foregoing embodiments, the plurality of operating limits includes operating limits for one or more of: torque of the at least one electric motor, electric power of the at least one electric motor, a pressure in the gas turbine engine, and a temperature in the gas turbine engine.

In a further embodiment of any of the foregoing embodiments, the plurality of operating limits includes operating limits for one or more of: a combustor of the gas turbine engine, a stator vane of the gas turbine engine, and one or more bleed valves of the gas turbine engine.

In a further embodiment of any of the foregoing embodiments, the effector command set also includes commands for at least one of stator vane positions and bleed valve positions.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

FIG. 3 is a flowchart of an example method for the HEP system of FIG. 1.

DETAILED DESCRIPTION

Figure 1:
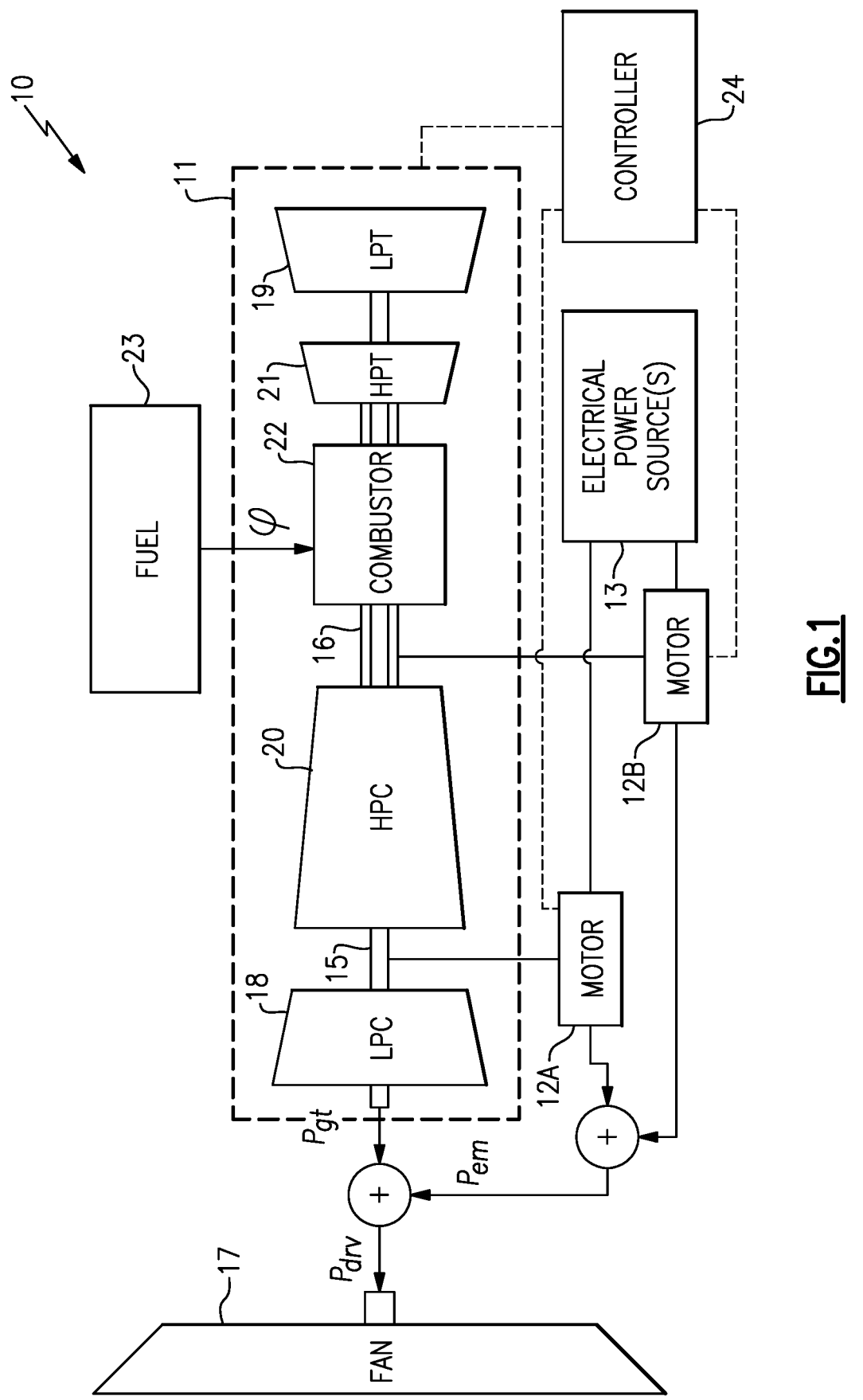
FIG. 1 is a schematic view of an example hybrid electric propulsion (HEP) system.

FIG. 1 is a schematic view of an example hybrid electric propulsion (HEP) system 10 for an aircraft. The HEP system 10 includes a gas turbine engine 11, which provides gas turbine power $P_{gt}$ that is combustion-based, and electric motors 12A-B that provide a combined electric power $P_{em}$. The gas turbine engine 11 and electric motors 12A-B cooperate according to a power splitting profile to provide a combined power $P_{drv}$. The power splitting profile indicates a power split between the gas turbine engine 11, electric motor 12A, and electric motor 12B. The power split may rely 100% on the combustion-based power $P_{gt}$, 100% on the electric power $P_{em}$, or on some combination of the two.

Within that, the power split may rely to varying degrees on the electric motor 12A and/or the electric motor 12B.

The HEP system 10 includes one or more electrical power sources 13 (e.g., batteries, such as lithium-ion batteries, that are configured to provide electrical power to the motors 12A-B).

The gas turbine engine 11 includes an inner shaft 15 and an outer shaft 16 that are coaxial and are both mounted for rotation about an engine central longitudinal axis. The inner shaft 15 generally interconnects a fan 17, a first (or low) pressure compressor 18, and a first (or low) pressure turbine 19. The outer shaft 16 interconnects a second (or high) pressure compressor 20 and a second (or high) pressure turbine 21. The electric motor 12A is configured to rotate the inner shaft 15, and the electric motor 12B is configured to rotate the outer shaft 16. In one or more embodiments, only one of the motors 12A-B is utilized. In one or more embodiments, when not driving their respective associated shaft, the electric motors 12A-B are driven by rotation of their respective associated shaft and are configured to output electric power for charging the electrical power source(s) 13.

A combustor 22 is arranged between the high pressure compressor 20 and the high pressure turbine 21. A core airflow is compressed by the low pressure compressor 18 then the high pressure compressor 20, is mixed and burned with fuel 23 in the combustor 22, and is then expanded over the high pressure turbine 21 and low pressure turbine 19. In FIG. 1, @ represents a fuel consumption rate.

A controller 24 is configured to control operation of the electric motors 12A-B and at least the fuel flow (e.g., φ) to the combustor 22 of the gas turbine engine 11. In one or more embodiments, the controller 24 is further configured to control the positions of adjustable stator vanes and/or bleed valves of the gas turbine engine 11 (not shown). The adjustable stator vanes may be provided in the low pressure compressor 18, low pressure turbine 19, high pressure compressor 20, and/or high pressure turbine 21, for example. Adjustable stator vanes and bleed valves are well-known in the art, and are therefore not discussed in detail herein.

The HEP system 10 has at least three effectors, namely, fuel (which is combusted by combustor 22 at a fuel consumption rate), electric motor 12A, and electric motor 12B. In one or more embodiments, the stator vanes and/or bleed valves are also effectors.

Figure 2:
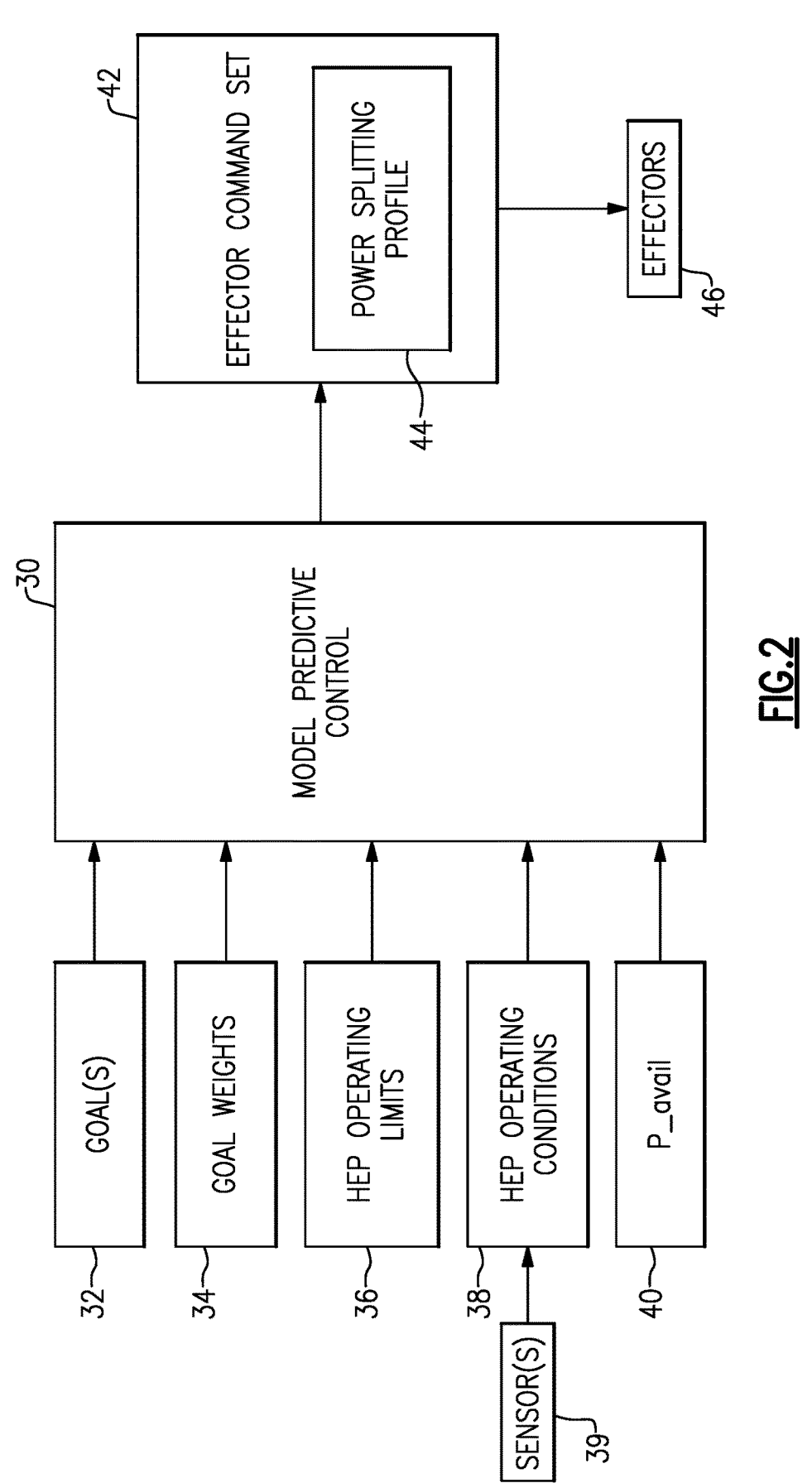
FIG. 2 is a schematic view of example inputs and outputs of a model predictive control for the HEP system of FIG. 1.

FIG. 2 is a schematic view of example inputs and outputs of a model predictive control (MPC) 30 for the HEP system 10 of FIG. 1. The MPC 30 is implemented by the controller 24. The MPC 30 receives at least one goal 32. A target fan speed for the fan 17 of the HEP system 10 is one of the at least one goals 32. The MPC 30 receives or determines at least one additional goal 32, which includes a target output (e.g., rotational speed or torque) of the electric motor 12A and optionally also a target output (e.g., rotational speed or torque) of the electric motor 12B. The MPC 30 also receives a plurality of goal weights 34, each of which correspond to a respective one of the goals 32.

The MPC 30 also receives operating limits 36 of the HEP system 10, current operating conditions 38 of the HEP system 10, and an amount of electrical power (P_avail) 40 that is currently available to the HEP system 10. In one or more embodiments, at least some of the HEP operating conditions 38 are received from one or more sensors 39 (e.g., temperature sensor, pressure sensor, effector position feedback sensor, etc.).

The HEP operating limits may include one or more of the following:

a torque limit of the electric motor 12A and/or the electric motor 12B an electric power output limit of the electric motor 12A and/or the electric motor 12B;

a pressure limit of the gas turbine engine 11;

a temperature limit of the gas turbine engine 11;

a position range of one or more stator vanes of the gas turbine engine 11;

a position range for one or more bleed valves of the gas turbine engine 11;

a respective rotational speed of the shaft 15 and/or the shaft 16;

a respective rotational speed of the low pressure compressor 18 and/or the high pressure compressor 20;

a respective rotational speed of the low pressure turbine 19 and/or the high pressure turbine 21;

a temperature of the electric motor 12A and/or electric motor 12B;

a temperature of one or more cables connecting one or more of the electric motors 12A-B to aircraft electronics;

a charge level of batter(ies) (corresponding to electrical power sourc(es) 13);

a temperature of batter(ies) (corresponding to electrical power sourc(es) 13).

The HEP operating limits are generally in place to protect mechanical hardware. However, some may be more transient to protect, e.g., the gas turbine engine 11 from an event such as a stall or burner flame out.

Based at least on the goal(s) 32, goal weights 34, amount of available electrical power P_avail, the plurality of operating limits 36 of the HEP system 10, and the HEP operating conditions 38, the MPC 30 determines an effector command set 42 for controlling effectors 46 of the HEP system 10. The effector command set 42 includes a power splitting profile 44 that indicates a power split between the gas turbine engine 11 and the at least one electric motor 12 for achieving $P_{drv}$ and the target fan speed for fan 17. In one or more embodiments, the power splitting profile indicates a power split between the gas turbine engine 11 (for which fuel is an effector), first electric motor 12A (second effector), and second electric motor 12B (third effector).

The effector command set 42 may also include effector commands for one or more stator vanes and/or one or more bleed valves (not shown), which may also act as effectors. The controller 24 implements the effector command set 42 by utilizing the effector command set 42 to control the effectors 46.

FIG. 3 is a flowchart of an example method 100 for the HEP system 10 of FIG. 1. The method is implemented by the controller 24. A target fan speed for the fan 17 is determined (step 102). In one or more embodiments, step 102 includes receiving the target fan speed as a thrust command. The thrust command may be received through input (e.g., input via a power control lever, throttle, collective, etc.) from a pilot in the case of a manned aircraft or a computer system for an unmanned aircraft. The amount of electrical power P_avail that is currently available to the HEP system 10 from the electrical power sources 13 is determined (step 104).

The MPC 30 is utilized to determine (step 106), based on the goals 32, goal weights 34, HEP operating limits 36, HEP operating conditions 38, and amount of available electrical power P_avail the effector command set 42 that includes the power splitting profile 44 which indicates a power split between the gas turbine engine 11 and the at least one electric motor 12 for achieving the target fan speed. The controller 24 then implements the effector command set 42 (step 110).

Steps 102-110 are iteratively repeated (e.g., on the order of milliseconds or seconds) for a plurality of sequential time periods to regularly update the effector command set 42 to reflect changes to the HEP system 10 and/or the target fan speed.

As discussed above, the MPC 30 receives at least one goal, which includes a target fan speed for the fan 17 of the HEP system 10. The MPC 30 receives or determines at least one additional goal 32, which includes a target power usage of the electric motor 12A and optionally also a target power usage for the electric motor 12B. Each of these goals also has an associated weight 34 which may be pre-assigned by a system administrator. The goal weights 34 give the administrator control over selecting the importance of the goals 32. In one or more embodiments, the fan speed (corresponding to a rotational speed of the shaft 15) is given a maximum weight, and other goals, such as power outputs of the electric motors 12A and/or 12B are given lower weights, which instructs the MPC 30 that its highest priority is to meet the fan speed goal.

Weights can influence how the efficiency the gas turbine engine 11 changes. In one or more embodiments, if one of the goals 32 is such that both electric motors 12A-B are providing power to the HEP system 10, but the electric motors 12A-B are not required to run to max power, the controller 24 can trade whether to use more high or more low spool (e.g., run electric motor 12A faster than electric motor 12B, or vice versa) to achieve a fan speed. Setting the weights at that time to lean towards using the low spool (corresponding to shaft 15) more than to the high spool (corresponding to shaft 16) can influence the controller's decision and improve efficiency (since the fan 17 is typically directly driven through the low spool). Other goals can be used to influence this too.

In one or more embodiments, the controller 30 utilizes the MPC 30 in step 106 to determine the power splitting profile 44 based on how quickly the HEP system 10 is approaching the plurality of operating limits of the HEP system 10. In one particular implementation, the MPC 30 determines which one or more particular ones of the plurality of limits the HEP system is approaching most quickly, and determines the power splitting profile 44 to slow a rate at which the HEP system 10 is approaching those particular ones of the HEP limits that are being most quickly approached.

In one example, assume that the HEP limit that is being approached the fastest of all of the HEP operating limits 36 is a temperature of the combustor 22. In this example, the MPC may decide to increase reliance on electric motor 12A and/or 12B and less on combustor 22 in order to reduce the temperature of the combustor. In another example, if an operating temperature of electric motor 12A, electric motor 12B and/or a battery (corresponding to electrical power source(s) 13) was approaching a limit, the controller 24 could back off on usage of electric motor 12A and/or 12B and rely more of the gas turbine engine 11, using fuel.

Figures 4A, 4B:
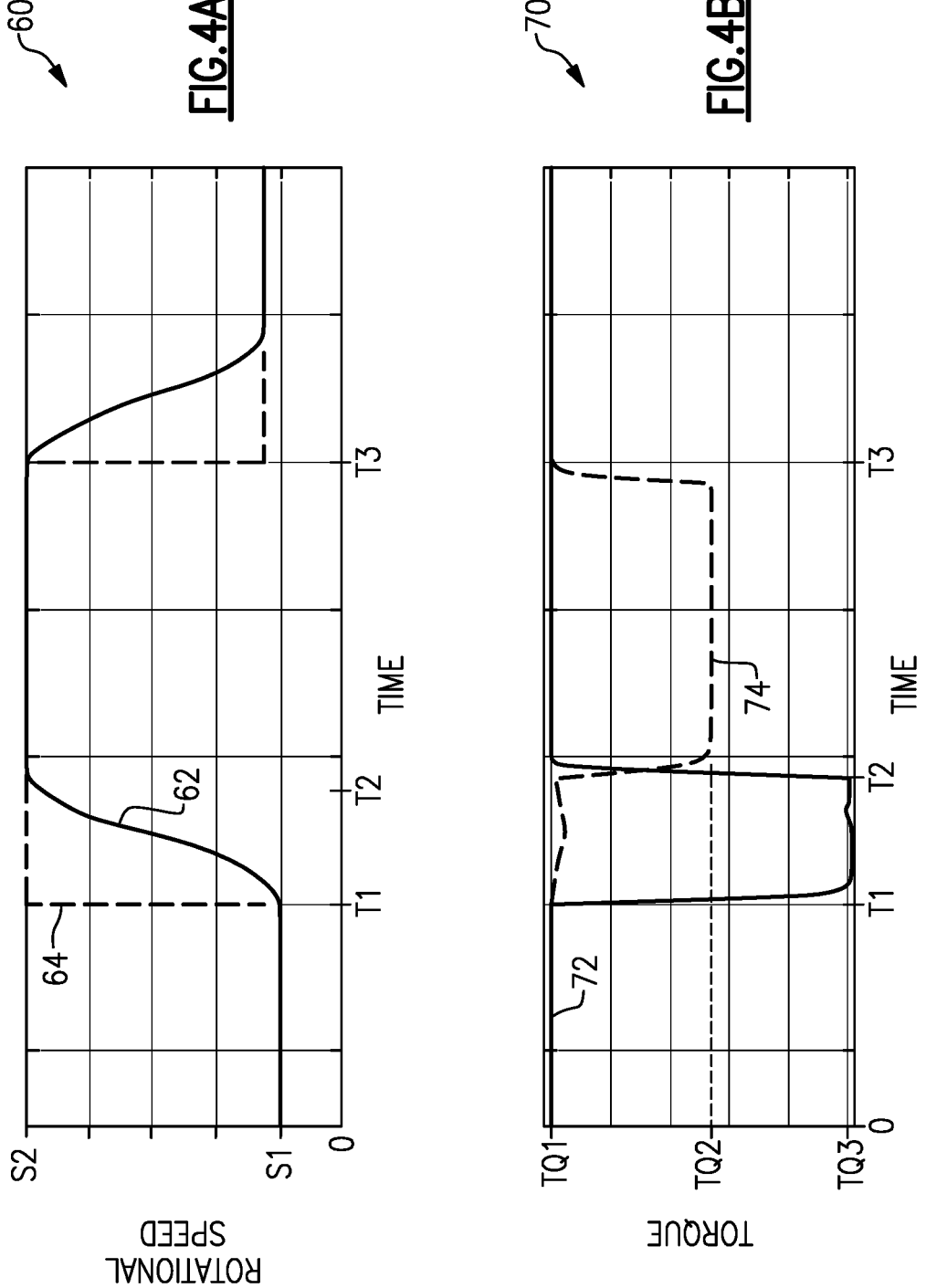
FIG. 4A is a graph of an engine shaft rotational speed over time.
FIG. 4B is a graph of electric motor output over time.

FIG. 4A is a graph 60 of an actual rotational speed 62 of the shaft 15 and a commanded rotational speed 64 of the shaft 15 over time. At time 0, the actual rotational speed 62 and commanded rotational speed 64 are the same (S1). At time T1, the commanded rotational speed 64 increases to rotational speed S2. Between time T1 and time T2, power to the electric motor 12A is increased (e.g., electric motor 12A is turned from OFF to ON) to assist with accelerating the rotational speed of the shaft 15 to rotational speed S2. By using the electric motor 12A in this manner, a temperature of the gas turbine engine 11 does not increase as much as it would if the gas turbine engine 11 was providing all of the acceleration between S1 and S2. This is significant, because maintaining a lower gas turbine engine temperature also mitigates thermal expansion, and therefore mitigates changes in rotor blade clearances (also known as "engine transients").

At approximately time T2, power to the electric motor 12B is increased (e.g., electric motor 12B is turned from OFF to ON) to mitigate an engine transient. From T1 to T2, the electric motor 12A is helping with managing the operating line of the compressor (e.g., LPC 18 and/or HPC 20).

FIG. 4B is a graph 70 of torque 72 of the electric motor 12A and torque 74 of the electric motor 12B. The graph 70 is a companion to the graph 60 and shows changes in the torque 72, 74 at the same time the rotational speed 62 is changing in graph 60. At time 0, the torque 72 and torque 74 are at a first torque value TQ1 (e.g., 0 Newton meters if the electric motors 12A-B are OFF). At time T1, the torque 72 of electric motor 12A increases from TQ1 to TQ3. At approximately time T2, the torque 72 of electric motor 12A returns to TQ1 (e.g., turns OFF) and torque 74 increases from TQ1 to TQ2.

Figure 5:
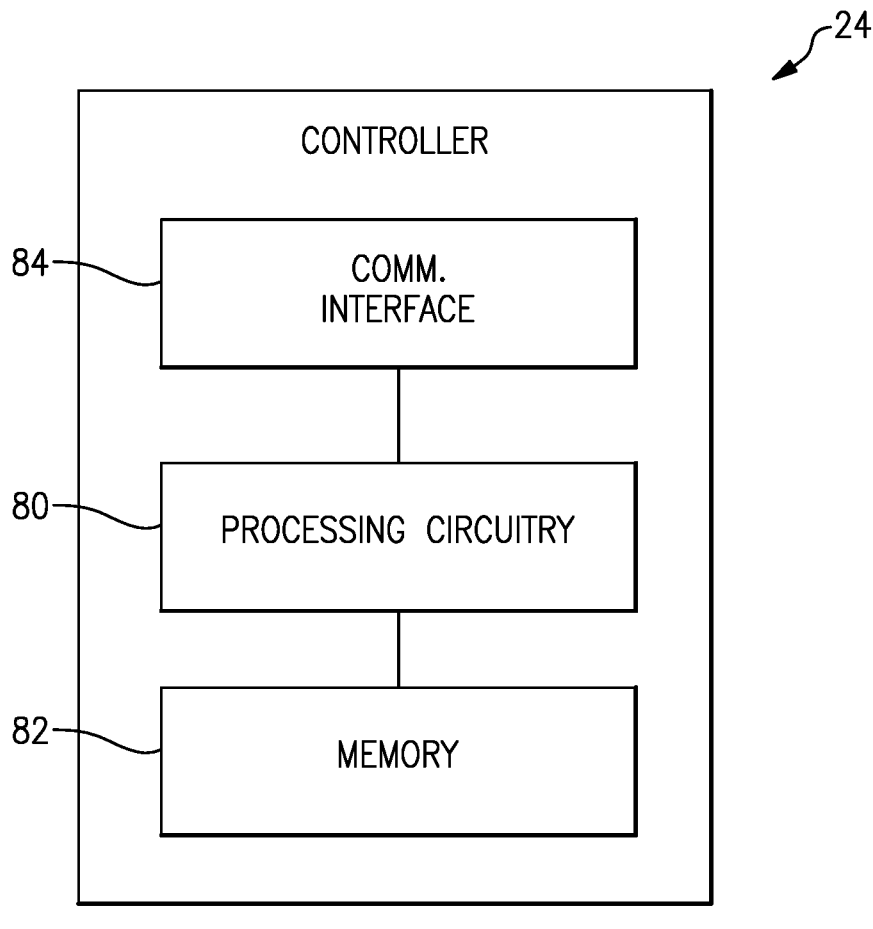
FIG. 5 is a schematic view of example hardware elements of a controller of FIG. 1.

FIG. 5 is a schematic view of example hardware elements of the controller 24 of FIG. 1. The controller 24 includes processing circuitry 80 operatively connected to a memory 82 and a communication interface 84. The processing circuitry 80 may include one or more microprocessors, microcontrollers, application specific integrated circuits (ASICs), or the like, for example. The memory 82 may include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). The memory 82 stores the MPC 30 of FIG. 2. The communication interface 84 is operable to communicate with external devices for sending and receiving data, such as data from the sensor(s) 38 and a throttle input command from a pilot.

Previous control strategies primary focused on engine speed or thrust as the main control goal. The MPC architecture disclosed herein, however, allows for targeting those goals while also targeting how much power to consume at the same time. The MPC architecture formulates its optimization problem to include power goals for the electric motors 12A and 12B. The electric motors 12A-B are then treated as effectors for the HEP system 10, where torque of the electric motors 12A-B act on the HEP system 10 itself. In one or more embodiments, the number of effectors equals the number of goals, which is a beneficial configuration for a control.

The power goal is important because the battery/batteries that power the electric motors 12A-B provide limited amounts of storage currently, and this target allows for mission level planning and optimization of when and how the stored energy is used. The power goals both provide the correct control configuration and provide a way to tune the system for a mission.

Next, the MPC architecture provides the ability to set goal and effector weights, meaning that some goals become more important than others. In this sense, fan speed or thrust is held as the highest goal and must be met all the time. Then motor power goals are set with a lower weight, meaning that the system will try to use the motor but in the event the engine doesn't need all the torque from that motor to meet its goal of fan speed, it will use less power than the goal requires. This way the MPC 30 has a priority-based method for determining how to best use the effectors 46 available to meet the aircraft thrust demands.

The techniques discussed herein provide for a steady, repeatable thrust response from the HEP system 10 and controller 24, while providing the tools for optimizing energy usage. The controller makes the HEP system 10 controllable while also providing tools for aircraft/mission level planning of power usage, storage, and generation. Without the addition of the power goals and torque effectors, combined with the MPC 30, the HEP system 10 would be less controllable and would have to need to rely on a combination of open and closed loop control to remain stable. By making this configuration compatible with the MPC 30, it is more functional and can better manage engine operability while optimizing power usage.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A method for a hybrid electric propulsion (HEP) system, comprising:
   determining a target fan speed for a HEP system, the HEP system including a gas turbine engine and at least one electric motor configured to rotate a respective shaft of the gas turbine engine, and the HEP system having a plurality of operating limits;
   determining an amount of electrical power that is currently available to the HEP system from one or more batteries configured to power the at least one electric motor;
   determining which one of the plurality of operating limits the HEP system is approaching most quickly;
   utilizing a model predictive control (MPC) to determine, based on the amount of electrical power that is currently available to the HEP system from the one or more batteries, and based on the plurality of operating limits of the HEP system, an effector command set that includes a power splitting profile indicating a power split between the gas turbine engine and the at least one electric motor for achieving the target fan speed, wherein said utilizing comprises utilizing the MPC to determine the power splitting profile to slow a rate at which the HEP system is approaching said one of the plurality of operating limits the HEP system is approaching most quickly; and
   implementing the effector command set.

2. The method of claim 1, wherein:
   the at least one electric motor includes a first electric motor configured to rotate a first shaft of the gas turbine engine, and a second electric motor configured to rotate a second shaft of the gas turbine engine; and
   the power splitting profile indicates a power split between the gas turbine engine, the first electric motor, and the second electric motor.

3. The method of claim 2, comprising:
   obtaining weights for a plurality of goals of the HEP system, the plurality of goals including the target fan speed and at least one prioritization goal for using at least one of the first electric motor and the second electric motor during flight;
   wherein the MPC utilizes the weights to determine the effector command set.

4. The method of claim 3, wherein the target fan speed has a highest weighting of the plurality of goals.

5. The method of claim 1, comprising:

iteratively repeating said determining steps, said utilizing the MPC, and said implementing the effector command set for a plurality of sequential time periods.

6. The method of claim 1, wherein the plurality of operating limits includes operating limits for one or more of:

torque of the at least one electric motor;

a pressure in the gas turbine engine; and a temperature in the gas turbine engine.

7. The method of claim 1, wherein the plurality of operating limits includes operating limits for one or more of:

a combustor of the gas turbine engine;

a stator vane of the gas turbine engine; and one or more bleed valves of the gas turbine engine.

8. The method of claim 1, wherein the effector command set also includes commands for at least one of:

stator vane positions; and bleed valve positions.

9. A controller for a hybrid electric propulsion (HEP) system, comprising:

processing circuitry operatively connected to memory, and configured to:

determine a target fan speed for a HEP system, the HEP system including a gas turbine engine and at least one electric motor configured to rotate a respective shaft of the gas turbine engine, and the HEP system having a plurality of operating limits;

determine an amount of electrical power that is currently available to the HEP system from one or more batteries configured to power the at least one electric motor;

determine which one of the plurality of operating limits the HEP system is approaching most quickly;

utilize a model predictive control (MPC) to determine, based on the amount of electrical power that is currently available to the HEP system from the one or more batteries, and based on the plurality of operating limits of the HEP system, an effector command set that includes a power splitting profile indicating a power split between the gas turbine engine and the at least one electric motor for achieving the target fan speed, wherein the MPC is utilized to determine the power splitting profile to slow a rate at which the HEP system is approaching said one of the plurality of operating limits the HEP system is approaching most quickly; and implement the effector command set.

10. The controller of claim 9, wherein:

the at least one electric motor includes a first electric motor configured to rotate a first shaft of the gas turbine engine, and a second electric motor configured to rotate a second shaft of the gas turbine engine; and the power splitting profile indicates a power split between the gas turbine engine, the first electric motor, and the second electric motor.

11. The controller of claim 10, wherein the processing circuitry is configured to:

obtain weights for a plurality of goals of the HEP system, the plurality of goals including the target fan speed and at least one prioritization goal for using at least one of the first electric motor and the second electric motor during flight;

wherein the MPC utilizes the weights to determine the effector command set.

12. The controller of claim 11, wherein the target fan speed has a highest weighting of the plurality of goals.

13. The controller of claim 9, wherein the processing circuitry is configured to:

iteratively repeat the determination of the target fan speed, the determination of the amount of electrical power that is currently available to the HEP, the utilization of the MPC, and the implementation of the effector command set for a plurality of sequential time periods.

14. The controller of claim 9, wherein the plurality of operating limits includes operating limits for one or more of:

torque of the at least one electric motor;

a pressure in the gas turbine engine; and a temperature in the gas turbine engine.

15. The controller of claim 9, wherein the plurality of operating limits includes operating limits for one or more of:

a combustor of the gas turbine engine;

a stator vane of the gas turbine engine; and one or more bleed valves of the gas turbine engine.

16. The controller of claim 9, wherein the effector command set also includes commands for at least one of:

stator vane positions; and bleed valve positions.

* * * * *